US005414384A

United States Patent [19]

Hegeler

[11] Patent Number: 5,414,384

[45] Date of Patent: May 9, 1995

[54] DEMODULATOR FOR RADIO DATA SIGNALS

[75] Inventor: Wilhelm Hegeler, Hildesheim, Germany

[73] Assignee: Blaupunkt-Werke GmbH, Hildesheim, Germany

[21] Appl. No.: 243,201

[22] Filed: May 16, 1994

[30] Foreign Application Priority Data

Jun. 4, 1993 [DE] Germany ........................ 43 18 643.2

[51] Int. Cl.$^6$ ............................................ H04L 27/20

[52] U.S. Cl. .................................. 329/304; 329/310; 375/324; 375/333

[58] Field of Search ...................... 329/304, 306, 310; 375/80, 83, 87, 77; 455/202, 345

[56] References Cited

U.S. PATENT DOCUMENTS

| | | | |
|---|---|---|---|
| 3,949,401 | 4/1976 | Hegeler et al. | 343/200 |
| 5,175,507 | 12/1992 | Roither | 329/304 |
| 5,278,560 | 1/1994 | Hegeler et al. | 341/155 |

FOREIGN PATENT DOCUMENTS

| | | |
|---|---|---|
| 0195989A3 | 10/1986 | European Pat. Off. . |
| 4029583A1 | 11/1991 | Germany . |

*Primary Examiner*—Siegfried H. Grimm

*Attorney, Agent, or Firm*—Frishauf, Holtz, Goodman & Woodward

[57] ABSTRACT

In a demodulator for use in the Radio Data System (RDS) as defined by the European Broadcasting Union, transmission of these signals is carried out through phase shift modulation of a suppressed subcarrier, a multiplex signal, which contains a signal with the frequency of the subcarrier passes through a band-pass filter and an amplitude limiter, and the amplitude-limited signal, having a carrier frequency, is sampled at a sampling frequency that is a multiple of the frequency of the subcarrier. The sampling values are summed over a preset portion of one period of the subcarrier. The summed sampling values are supplied to a digital signal processing circuit.

11 Claims, 7 Drawing Sheets

DEMODULATOR FOR RADIO DATA SIGNALS

Cross-reference to related patent and applications, assigned to the assignee of the present invention, the disclosures of which are hereby incorporated by reference: U.S. Pat. No. 3,949,401, HEGELER et al, issued 6 Apr. 1976, FREQUENCY I.D. CIRCUIT FOR TRAFFIC INFORMATION RECEP. SYSTEMS; U.S. Pat. No. 5,278,560, HEGELER et al, issued 11 Jan. 1994, (R.2116) BINARY SIGNAL GENERATOR FOR RDS RADIO RECEIVER;

German application DE 43 18 641, filed 4 JUN. 1993, and corresponding U.S. Ser. No. 08/243,203, filed May 16, 1994. (Attorney docket 940026-MO, Assignee docket R. 2233).

German application DE 43 18 642, filed 4 Jun. 1993, and corresponding U.S. Ser. No. 08/246,737, filed May 20, 1994, Hegeler, Kässer, Nyenhuis, & Vogt. (Attorney docket 940033-MO, Assignee docket R. 2231).

Cross-Reference to related literature:

European Broadcasting Union Technical Standard 3244-E, entitled SPECIFICATIONS OF THE RADIO DATA SYSTEM RDS FOR VHF/FM SOUND BROADCASTING (EBU Technical Centre, Brussels, Mar. '84, 60 pp.).

1. Field of the Invention

The invention relates generally to a demodulator for radio data signals (RDS) as defined by the European Broadcasting Union.

2. Background

With the known radio data systems, in addition to audio signals, one can transmit data signals. These data signals contain, for instance, the name of the program being broadcast, or other information. During VHF/FM audio stereo broadcasting, in order to ensure compatibility among the audio signals and traffic announcement signals, the Radio Data System (RDS) modulates the 57 kHz subcarrier, also used for traffic announcements, with the RDS data to be transmitted. However, the sidebands are outside the modulation frequencies used for various traffic announcement signals. A bi-phase coding system is selected that causes no generation of spectral components at 57 kHz, as well as implicit co-transmission of the clock signal. The entire spectrum of the modulated radio data signal, hereinafter referred to as the "RDS signal," is limited to ±2.4 kHz.

At the regeneration of the subcarrier, which is necessary for demodulation, and at phase jump detection, distortions of the radio data signal should not, to the extent possible, result in a demodulation error. This is particularly difficult if, in addition to radio data signals, traffic broadcast signals are also transmitted.

Therefore, digital signal processing methods are frequently used, either as special circuits or as programmable signal processors. In both cases, relatively large amounts of data must be processed in relatively short periods.

SUMMARY OF THE INVENTION

It is an object of this invention to provide a demodulator for radio data signals in which the signal at the subcarrier frequency is prepared in an advantageous manner for subsequent digital signal processing.

In the demodulator according to the invention, this objective is achieved by the amplitude limited signal with the carrier frequency being sampled at a sampling frequency that is a multiple of the subcarrier frequency and by summation of the sampling values over a preset portion of a period of the subcarrier and by supplying the summed sampling values to a digital signal processing circuit.

It is advantageous to provide for the demodulator according to the invention, that the digital signal processing circuit contains, at its input, a digital band-pass filter with a center frequency corresponding to the frequency of the subcarrier and/or that the preset portion equals one-quarter period.

According to an advantageous embodiment of the demodulator according to the invention, the digital signal processing circuit furthermore contains a circuit for integrating the output signal of the digital band-pass filter over a half-wave of the bit clock signal each, circuits for calculating the difference of two successive integrals and the sum of the differences, and this sum of the differences is used to generate the demodulated output signal and a switch phase correction signal. This embodiment is distinguished by particularly advantageous additional signal processing, specifically for correcting the 180° error when recovering the bit clock signal.

In an alternate embodiment, a difference is generated from the differences of two successive integrals, and a quality signal is generated from the difference of the differences.

In another alternate embodiment, it can be provided that the digital band-pass filter generates two orthogonal output signals, whose most significant bits can be supplied to a traffic broadcast signal recognition circuit and to a phase shift control circuit for generating a regenerated subcarrier.

In another advantageous embodiment of the circuit according to the invention, the most significant bits of the sum of the differences and the difference of the differences are used to generate signals for controlling the phase of a regenerated radio data clock signal.

In another alternate embodiment, two up/down counters clocked at a multiple of the subcarrier frequency are provided for summing the sampling values, and these sampling values are alternately supplied to a control input of one of the up/down counters for the duration of one fourth period of the subcarrier each, and these up/down counters count up for one half period of the subcarrier and down for the other half period of the subcarrier, and at each end of a period, the counter reading is supplied to a circuit for signal processing. This signal processing circuit may be a microprocessor wherein a program for further evaluation of the supplied signals is executed.

The advantage of this feature is that there is a small amount of data for processing in the microprocessor, because the necessary mixing with the 57 kHz has already occurred in the data to be supplied to the microprocessor.

In an advantageous embodiment of this feature, bandpass filtering of the summed sample values can be accomplished in a particularly simple manner by setting the respective up/down counter to a predetermined fraction, preferably half of the transferred counter reading, after counter reading transfer.

DRAWINGS

Further features of the embodiments will be apparent from the drawings, of which:

Identical components have been designated with the same reference characters in each drawing.

DETAILED DESCRIPTION

The ADD symbol represents a serial adder consisting of a full adder with three inputs A, B, and CI (=Carry-in) and two outputs S and CO (=Carry-out). Output S assumes 1 when A+B+CI is odd. Output CO assumes 1 when A+B+CI is >1. Another component of the adder is a D-flip-flop whose data input D is connected to CO and output Q to CI. The D-flip-flop is clocked with the same clock signal as is supplied to the shift register connected to the respective adder output. At the Set or Reset input, the flip-flop can be preset prior to an addition; in the Figures, this is indicated by "c0=. . . "

Figure 1:
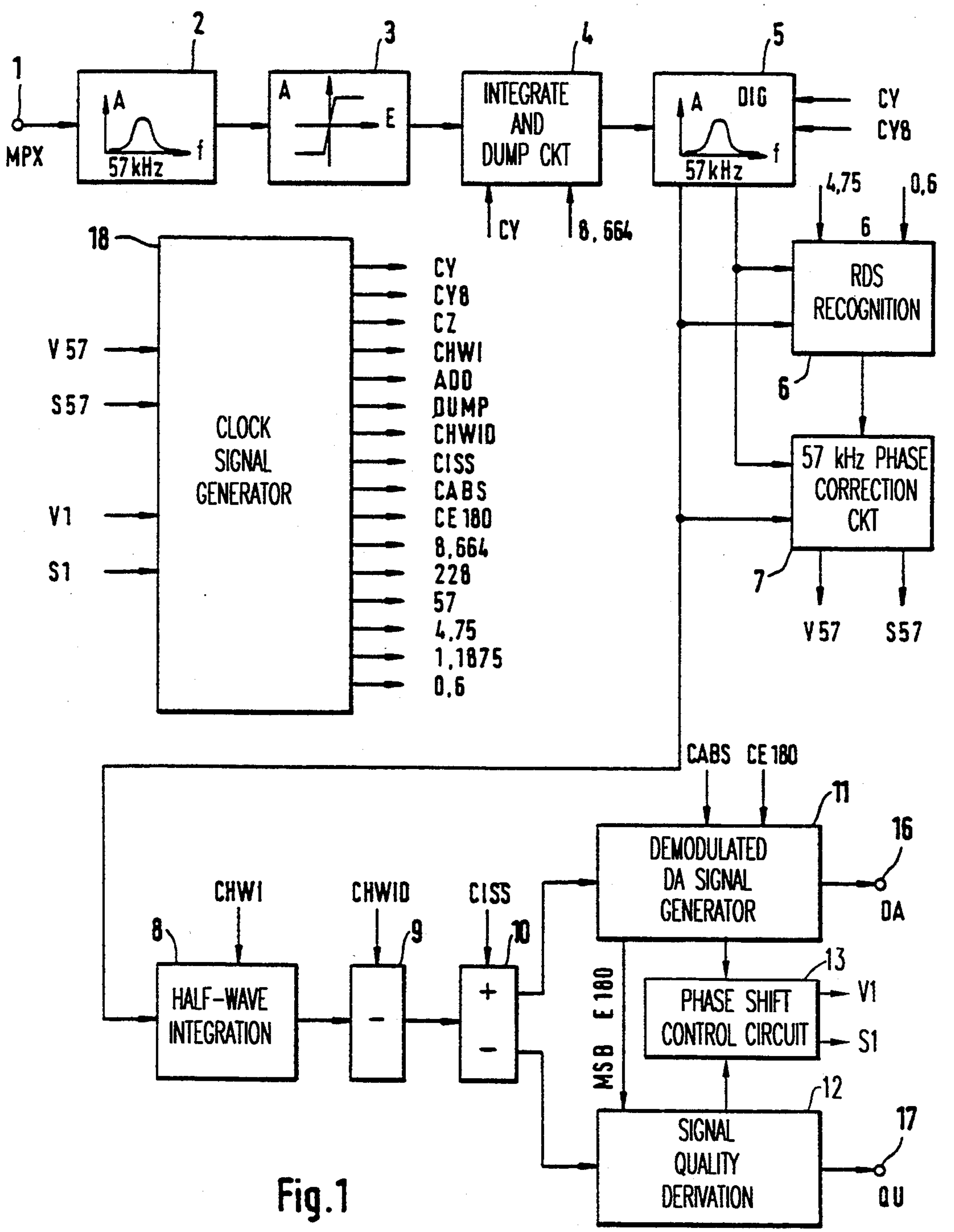
FIG. 1 is a block diagram of the demodulator according to the invention.

Furthermore, flip-flops are illustrated in the figures through their data input D and at least one output Q, while shift registers are labeled SR, counters are labeled CNT, and integrators are labeled FIG. 1 illustrates an embodiment of the RDS demodulator according to the invention in which a received multiplex signal is supplied to a terminal 1. This multiplex signal may contain a traffic announcement signal, in addition to the radio data signals. After filtering in a 57 kHz band-pass filter 2, the amplitude of the multiplex signal is limited at 3. The resultant binary signal controls an integrate and dump circuit 4 whose output signal passes through a digital band-pass filter 5. This band-pass filter has two outputs for the two orthogonal components YC and YS of the filtered 57 kHz signal Y.

Both components are supplied to a circuit 6 for traffic announcement signal recognition, and a circuit 7 for phase correction of the 57 kHz signal. One of the components is supplied to a circuit 8 for half-wave integration. From the output signal of this circuit, two values, each time-delayed by one fourth of the bit clock period, that is 1/4.75 KHz are subtracted at 9. From these values HWID, the sum ISS and difference ISD are generated at 10.

The sum ISS serves circuit 11 to generate the demodulated radio data signal DA and a correction signal to correct a 180° phase error. The difference ISD is supplied to a circuit 12 for deriving a signal which indicates the quality. Among other things, in both circuits 11 and 12 the most significant bit MSB of signals ISS or ISD is separated and supplied to a circuit 13 for phase shift control. In this circuit, two signals V1 and S1 are generated with V1 controlling a variation of the phase of the 1.1875 kHz signal and S1 controlling the sign of the variation. The most significant bit of sum ISS passes through circuit 11 that is controlled by the correction signal. At output 16, the radio data signal DA is available, while a quality signal QU can be obtained at an output 17.

A clock signal generator 18 generates clock signals for the individual circuits. These clock signals are described in greater detail in connection with FIG. 2 through 7. Signals V57, S57, V1 and S1, generated in circuits 7 through 13, control frequency dividers contained in the clock signal generator 18.

Figure 2:
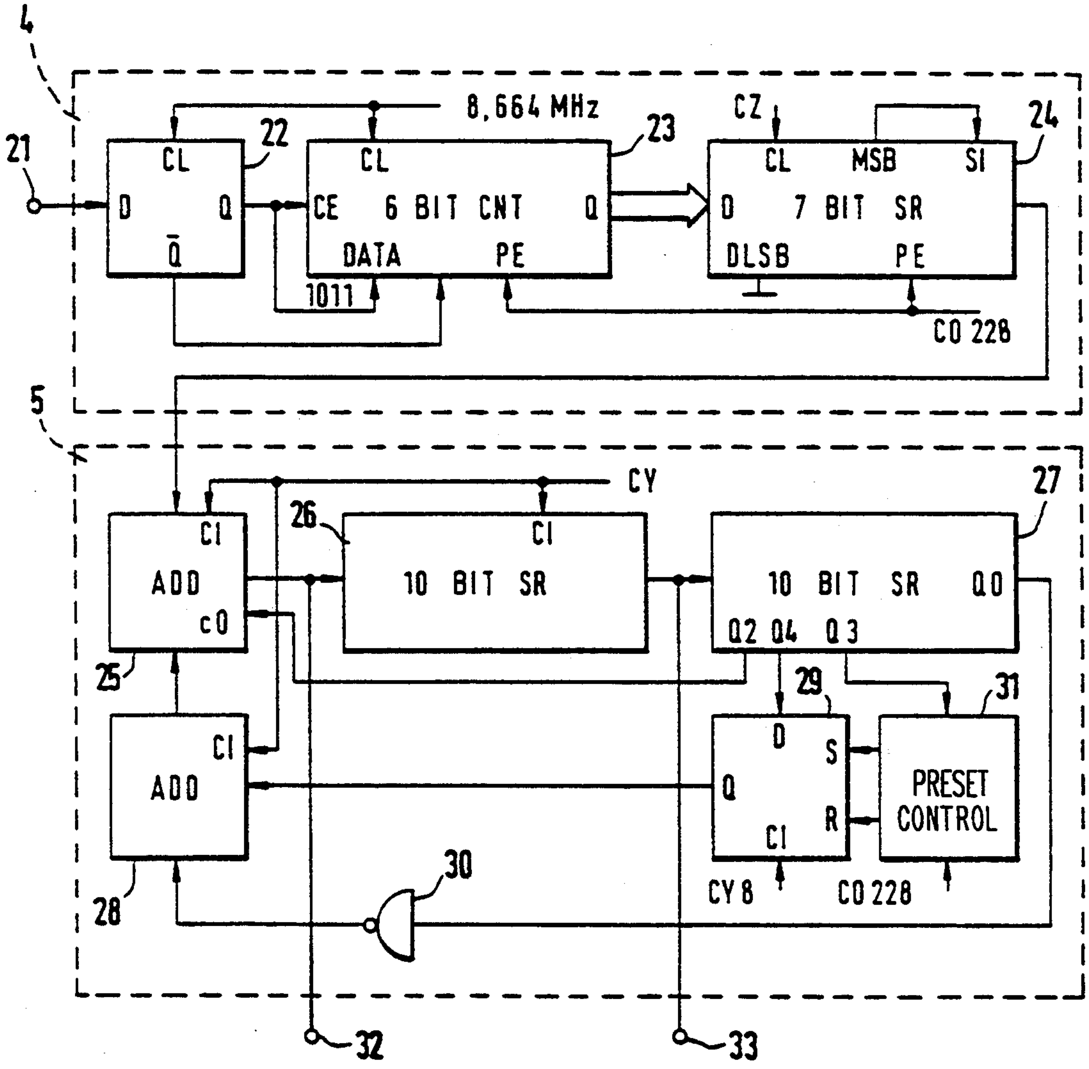
FIG. 2 is a circuit for integrating and dumping and a digital band-pass filter.

FIG. 2 shows a circuit 4 for integrating and dumping and the digital band-pass filter 5 in a more detailed illustration than FIG. 1. The binary signal from limiter 3 is supplied to an input 21 of a D-flip-flop 22 that is clocked with a clock signal with the frequency of 8.664 MHz. One output Q of the D-flip-flop 22 is connected to a count-enable input CE of a 6-bit counter 23 that is also clocked with the frequency of 8.664 MHz. In synchrony with a clock signal CZ having a frequency of 228 kHz, the content of counter 23 is transferred to a 7-bit shift register 24. In this process, one clock pulse is suppressed or ineffective, while the 6-bit counter 23 is reset to ix-19, where ix is the value of the binary signal (0 or 1) valid at the time of the missing clock pulse. The content of the 6-bit counter 23 is received at the shift register 24 and supplemented with an additional bit, namely the least significant bit, which is set to 0 at the time of loading. This permits use of the same clock signal for this, and the following, shift registers. The serial data input SI of shift register 24 is connected to the MSB output, enabling an arithmetic-shift-right with 10 bits.

The digital band-pass filter 5 consists of a recursive filter of second order with the function $Y(n)=2\cdot X-\frac{7}{8}\cdot Y(n-2)$ at a clock frequency of 228 kHz. This filter has an amplification factor of 16 at 57 kHz. The input signal of the filter is multiplied by 2, because the last three bits in the filter are dropped for evaluation due to the rounding error. The filter consists of an adder 25, two shift registers 26, 27 serving as delay circuits, another adder 28, a 1-bit memory 29, and an inverter 30.

The 1-bit memory is pre-set with the fourth least significant bit. At its data input, the fifth least significant bit is present. Six clock pulses follow, leaving the most significant bit in the 1 bit memory 29. The "error" of −1, caused by the generation of the complementary, is intentionally not corrected, thus eliminating the sign problem for Y=0 values. Y=0 then has a functional valency of +0.5 while Y=−1 corresponds to −0.5. In this manner, functional 0 is exactly the same as the transition of the most significant bit, which is advantageous for the 57 kHz phase shift control.

After phase shift control, mean values of both orthogonal components of the 57 kHz signal are available in the two shift registers 26 and 27 of band-pass filter 5. Read at a 57 kHz rate, these mean values can be unambiguously assigned to the radio data signals and, if applicable, the traffic announcement signals. The most significant bits (signs) of the quantities serve for phase control and traffic announcement recognition. From the component of the 57 kHz signal that contains the radio data signal, a 5-bit number is used for radio data demodulation.

The two components of the 57 kHz signal are supplied to circuit 6 (FIG. 3) at 34, 35 for traffic announcement signal recognition. The two components each pass through two D-flip-flops 36, 37; 38, 39 that are clocked with a 4.75 kHz signal. The input and output signals of the D-flip-flops 37, 39 are each supplied to an EXOR gate 40, 41 that gives off a pulse at every sign change. Flip-flops 42, 43 are set by these pulses and are reset by a clock signal with a frequency of approximately 0.6 kHz. This and the subsequent NAND gate 44 recognize that there is no sign change in two 1.1875 kHz periods in at least one of the components. In this case, the presence of radio announcement signals is considered probable. For this reason, a subsequent 5-bit integrator 45 is incremented or, in the other case, decremented. The integrator is equipped with an overflow restriction on both sides. The size of the increment and decrement depends on the counting direction and on the second most significant bit of integrator 45 according to the following table:

| Counter reading | 0 . . . 7 | 8 . . . 15 | 16 . . . 23 | 24 . . . 31 |
|---|---|---|---|---|
| yes | +1 | +2 | +1 | +2 |
| no | −2 | −1 | −2 | −1 |

For statistically alternating yes/no information, the integrator has three stable positions, namely the center and both end positions. It can only leave one of these positions with significant bias towards one information. This hysteresis causes a quick decision at good signals and a large time-lag at disturbances. The most significant bit of the integrator content is the output signal and indicates, whether or not the presence of a traffic announcement signal was recognized. It can be picked up at an output 46.

Figure 3:
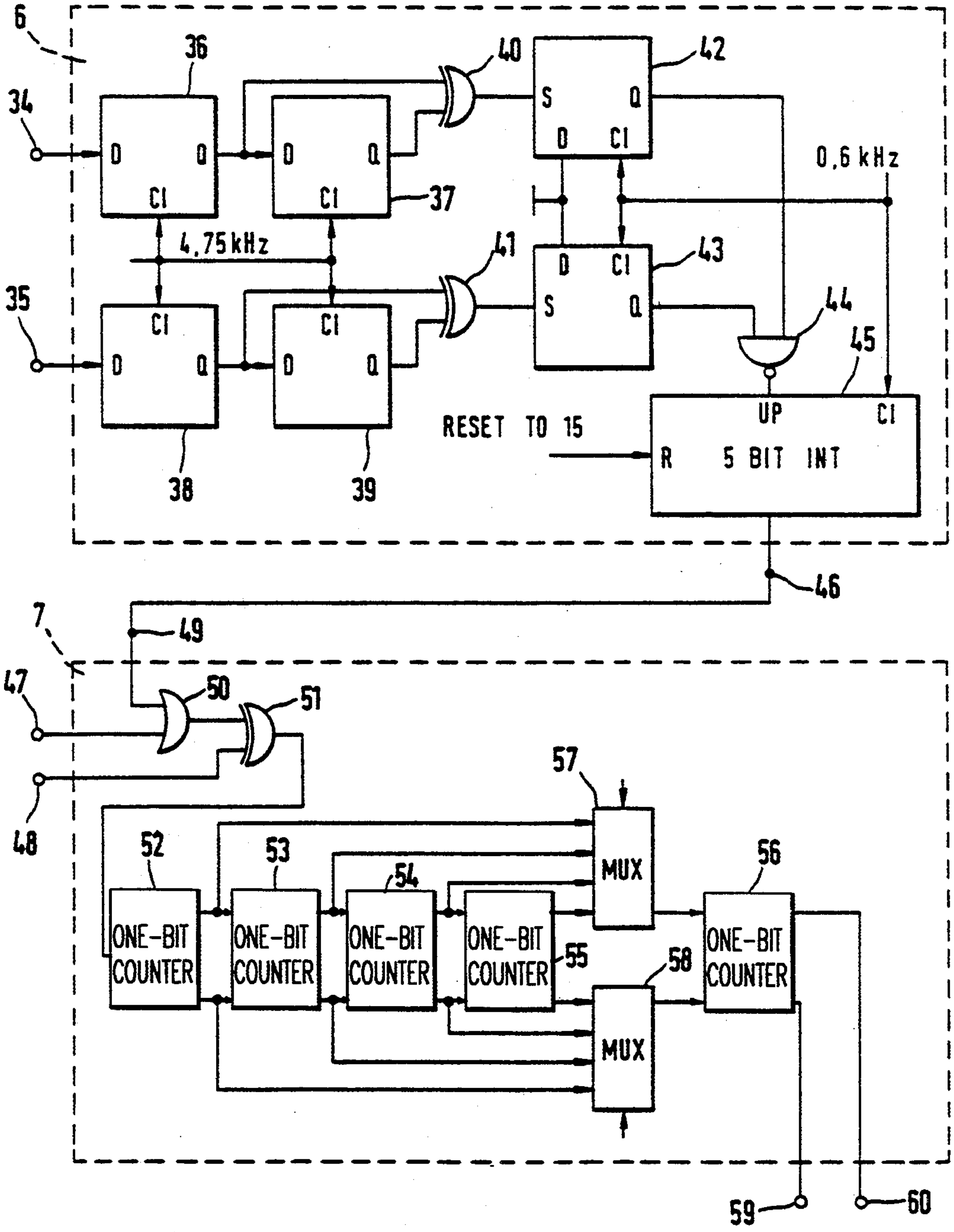
FIG. 3 is a detector for traffic announcements and a circuit for phase correction.

From the digital band-pass filter 5, the circuit 7 for the 57 kHz phase correction, also shown in FIG. 3, is supplied with the most significant bit of both components of the 57 kHz signal of circuit 6 via inputs 47, 48, 49. After logical addition with an OR gate 50 and EXOR gate 51, the signals control a 5-bit counter made up of 1 bit counters 52 to 56, that are connected to each other with overflow and underflow outputs, via an input UP. After one overflow and one underflow of the entire counter, the 5-bit counter is set to the center of its counting range. The size of the increments and of the counting range may be variable, to enable quick control at the beginning and a larger time lag during stationary operation. This can be achieved by disabling individual 1-bit counters using multiplexers 57, 58. Suitable switching signals are supplied to the inputs of multiplexers 57, 58, indicated by arrows.

If the ARI (Trademark Reg. No. 1,282,281 of Blaupunkt) signal supplied at 49 assumes value 1, only one component is used for control. This component automatically becomes the RDS component, because the phase control loops turn the phase in such a manner that the mean is 0. This corresponds to a zero passage of the carrier signal. For ARI=0, the logical EXOR addition of the two components supplied at 47 and 48 is used as a Costas loop for phase shift control. Suitable inverting ensures that the same component becomes the RDS component, just as for ARI=1.

Then, signals V57 and S57 for controlling the phase position of the 57 kHz carrier are available at outputs 59, 60 of circuit 7. For the value 1, signal V57 then causes a phase variation and occurs briefly at an overflow or underflow of the counter 56. Signal 857 represents the sign, that is, the direction of the variation, and consists of the respective content of counter 56. In the 228 kHz generator (FIG. 7), signals V57 and S57 cause the clock frequency of 8,664 MHz to be divided by 37 and 39 respectively rather than by 38 as usual.

For good 1.1875 kHz phase shift control and RDS demodulation, among other things an approximately sinusoidal valuation of the 57 kHz RDS sampling values is needed, and that for two different phases simultaneously. Thus, a feature of the demodulator according to the invention is, that initially two half-wave integrals shifted 90° with respect to each other are formed, that are used to put together the desired functions.

Since a different and sufficiently finely graded valuation of the 57 kHz sampling values would necessitate a multiplication, the valuation at the demodulator according to the invention is achieved through different chronological density of the sampling values used for integration. This is acceptable, because in a 57 kHz band-pass filter, the values vary only slightly in a few 57 kHz periods. 57 kHz was selected as highest sampling frequency (highest density of sampling values). This saves at least one bit in the circuits necessary for this operation, as compared to a frequency of 114 kHz, which would also be possible.

Figure 4:
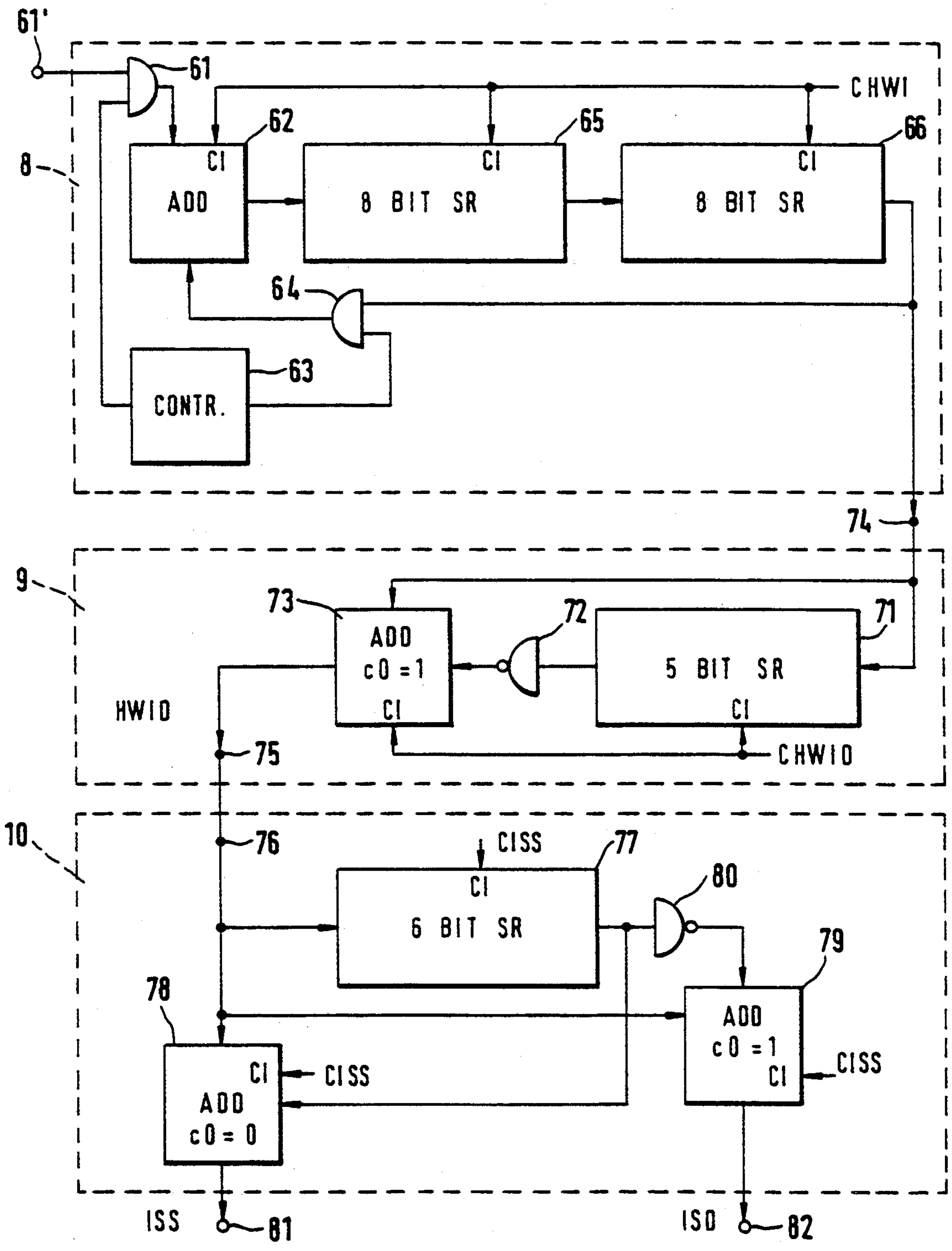
FIG. 4 is a circuit for integration of half-waves, as well as for further processing of the integration result.

For this purpose, eleven sampling values Y of a half-wave of the bit clock signal are summed up to a half-wave integral HWI in circuit 8, details of which are shown in FIG. 4. The five least significant bits of the individual sampling values Y are disregarded. This is achieved with an AND gate 61, an adder 62, and another AND gate 64, which are controlled jointly by a control circuit 63, and two 8 bit shift registers 65, 66. The sample values Y are supplied to an input 61' of circuit 8. The sine and cosine half-wave integrals SHWI and CHWI are formed simultaneously according to the following method:

In a 4.75 kHz period, one counter in the frequency divider 125 (FIG. 7) counts the 57 kHz periods, with counter states varying in a range between 0 and 11. Two 8-bit words (SHWI and CHWI) rotate in a 16-bit shift register that consists of the shift register 65, 66 and whose input permits addition of the 5-bit sample values as well as deleting of the rotating values (8-bit).

When the counter in the frequency divider 125 (FIG. 7) is at six, neither shifting nor adding occurs, thus permitting this phase to be used for 1.1875 kHz phase variation.

In the following diagram, |rot| (r) indicates a rotation of the data by 8 bit. At counter readings of <3 and >8, rotation between the additions is necessary. The line of the diagram designated with s-c indicates which half-wave (sine or cosine) is used for addition. The add line indicates with an a, if an addition is carried out. In the sin and cos lines, an * indicates which component the addition is carried out for, while the moment for extracting the value for the respective half-wave is shown in the dump line. The respective memory in the shift register is then erased.

| 125 | 11 | 0 | 1 | 2 | 3 | 4 | 5 | 6 | 7 | 8 | 9 | 10 | 11 | 0 |
|---|---|---|---|---|---|---|---|---|---|---|---|---|---|---|
| rot. | r r | r r | r r | r r | | r | r | | r | r | r r | r r | r r | r |
| s-c | c s | c s | c s | c s | c | s | c | | s | c | s c | s c | s c | s |
| add | a | a | a | a | a | a | a | | a | a | a | a | a | a |
| cos | * | * | * | * | * | | * | | | * | | | | |
| sin | | | | | | * | | | * | | * | * | * | * |
| dump | | SHWI | | | | | | | | | | | | CHWI |

From the half-wave integrals HWI gained in this manner, the three least significant bits can be disregarded. Rounding errors do not need to be corrected here, because hereafter only differences of the half-wave integrals HWI are used.

To implement the frequency divider 125 (FIG. 7), a chain consisting of one $\frac{1}{3}$ and one $\frac{1}{4}$ frequency divider is advantageous, because it simplifies clock generation. If needed (for V1=1), the $\frac{1}{3}$ divider divides once by two or four instead of by three.

In circuit 9 (FIG. 1 and FIG. 4), the difference of two successive half-wave integrals HWI is created at 4.75 kHz clock intervals. A 5 bit shift register 71 is provided for this purpose whose output is connected to an adder 73 via an inverter 72. The HWI signal supplied to 74 reaches the shift register 71, and also the adder 73. One output of the adder becomes the output 75 of circuit 9, where a signal HWID(n)=HWI(n)−HWI(n−1) is present. With adders of this type, that increase the number of bits, one needs to ensure that at the last clock signal (in this case, the sixth), the most significant bits of both input signals are present at the adder. In circuit 9, this can be accomplished by suppressing each fifth pulse of the clock signal CHWID for the shift register 71, thus shifting the most significant bit not until the sixth pulse.

In circuit 10 (FIG. 1 and FIG. 4), the sum and the difference of two successive signal values HWID are formed. This is carried out at 4.75 kHz clock intervals with 6-bit accuracy. An input 76 is supplied with the signal HWID, which reaches a shift register 77, whose output is directly connected to an adder 78 and via an inverter 80 to another adder 79. As additional signal, the signal HWID from input 76 is supplied to adders 78, 79. One output 81 delivers the sum signal ISS and an output 82 the difference signal ISD, both with a bit width of 6, since the number of bits does not increase at these additions. This is because the newly generated most significant bit equals the second most significant bit, and can thus be disregarded.

For the sum signal ISS, this is exactly true, since ISS(n)=HWID(n)+HWID(n−1)=HWI(n)−HWI(n−2) with both HWI values having a width of only 5 bit. For the difference signal ISD, an overrun of the 6-bit space is only possible for strong amplitude demodulation (>1.5 kHz) of Y. This, however, is unlikely because of the designated bandwidths. Also such a singular error in the signal ISD would only lead to one single wrong value of the quality signal, which is tolerable.

Figure 5:
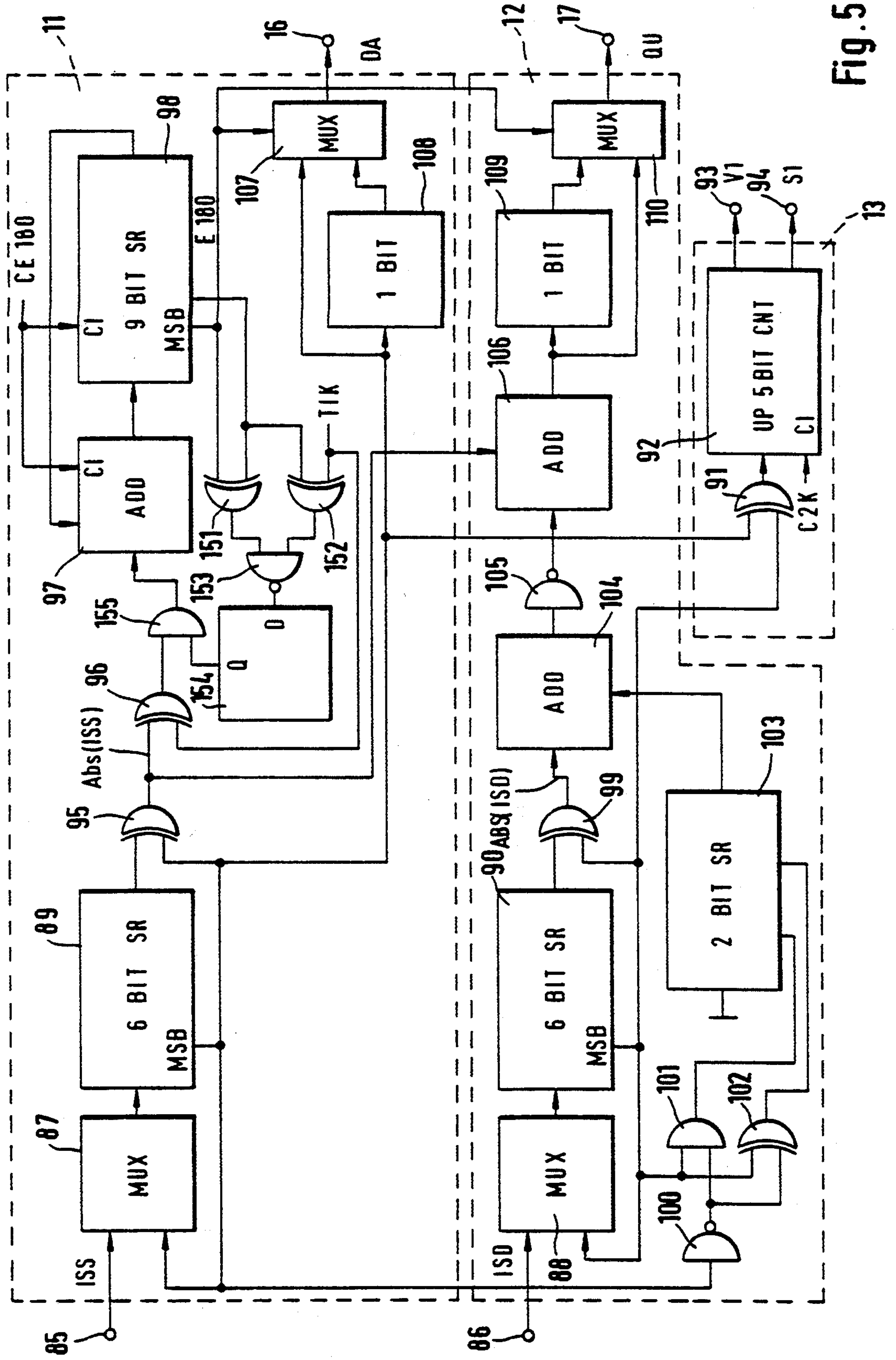
FIG. 5 is a circuit for deriving a radio data signal and a quality signal.

The ISS signal is supplied at output 81 of circuit 10 (FIG. 4) to input 85 of circuit 11 (FIG 5) for 180° phase error detection. Via output 82, the difference signal ISD is supplied to circuit 12 (FIG. 5) to derive a quality signal. Both circuits are shown in FIG. 5, and after the input 85, 86 each features a multiplexer 87, 88 followed by a 6 bit shift register 89, 90. This shift register serves, among other things, the separation of the most significant bit MSB from signals ISS and ISD, and supplying this MSB to a circuit 13 for phase shift control of the 1.1875 kHz clock rate.

Figure 7:
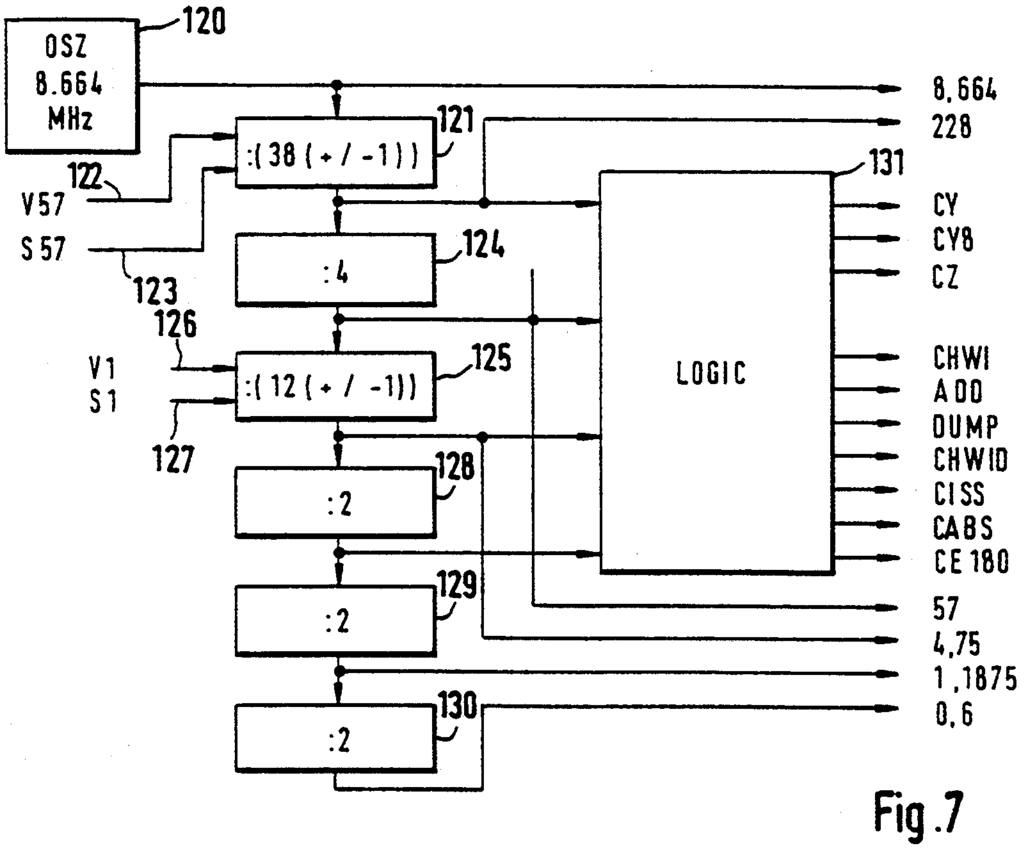
FIG. 7 is a circuit for clock signal generation.

Circuit 13 (FIG. 5) consists of an EXOR gate 91 followed by a 5-bit up/down counter 92 which is clocked at a frequency of 2.375 kHz. If a 1 is present at the output of the EXOR gate 91, the counter counts up, otherwise down. In an overflow situation, the phase M12=6 is doubled once in the frequency divider 125 (FIG. 7); in an underflow situation, it is suppressed once. At power-up and after an overflow or underflow, the content of the counter 92 is set to a middle value. For faster phase stabilization, the size or the increments may be controllable, as in circuit 7. Outputs 93, 94 of circuit 13 offer signals V1 and S1 with signal V1 causing a variation of the phase in a direction determined by S1. Outputs 93, 94 are connected to inputs 126, 127 of frequency divider 125 (FIG. 7).

Since the phase shift control of the 1.1875 kHz clock signal caused by circuit 13 permits a phase error of 180° in relation to the true RDS bit clock signal, a decision based on the data (ISS) derived from the 2.375 kHz clock rate is necessary. The sum of the absolute amounts of ISS is larger for the valid data than for the wrong data in between.

For this reason, absolute values of the sum signal ISS are added in an accumulator with alternating signs at a clock rate of 2.375 kHz.

When generating the absolute values at a clock rate of 2.375 kHz, the data are intermediately stored in shift register 89 (FIG. 5), because the most significant bit, representing the sign, must already be known at the beginning of the additions. Initially, the shift register is loaded with ISS. The most significant bit MSB is supplied to the input of shift register 89 via a multiplexer 87 at which time addition may start. The absolute values Abs(ISS) are available at the output of an EXOR gate 95. Another EXOR gate 96 is supplied with the absolute values and in addition with a 1.1875 kHz square wave signal T1K causing the alternating action. Prior to adding, c0 is set to MSB XOR T1K.

An adder 97 and an 8 bit shift register 98 serve as accumulator. This supplies the accumulator with overflow restriction on both sides. For the accumulator content E180, nine bit are used instead of eight, blocking the addition in the top quarter of its counting range and blocking subtraction in the bottom quarter. This is accomplished with two EXOR gates 151, 152, a NAND gate 153, a flip-flop 154, and an AND gate 155.

The most significant bit of the accumulator content E180 determines which of the data (the most significant bit of ISS) derived at the 2.375 kHz clock rate and the quality signals are valid and accordingly controls a multiplexer 107, which supplies the most significant bit of signal ISS directly, or delayed by one half of the RDS clock period with a flip-flop 108, to output 16.

To generate the quality information, the absolute value Abs(ISD) is formed from the difference signal ISD supplied at 86 in circuit 12 using the multiplexer 88 and the shift register 90 as well as an EXOR gate 99. The other components of circuit 13 perform the function MSB(Abs(ISS)-Abs(ISD)−2). Each amount being added has an error of −1, when it has passed through an odd number of inversions, that is, −1, when ISS is negative (MSB=1) and an additional −1, when ISD is positive. Thus, in place of the above mentioned 2, a subtraction of (1-MSB(ISS)+MSB(ISD)) is necessary, which is carried out using an inverter 100, an AND gate 101, an EXOR gate 102, a 2 bit shift register 103, and an adder 104. After inverting the output signal of adder 104 at 105, the absolute value of the sum signal is added in another adder 106. A flip-flop 109 and a multiplexer 110 are used to correct the 180° phase error. The quality signal QU can be picked up at output 17.

Figure 6:
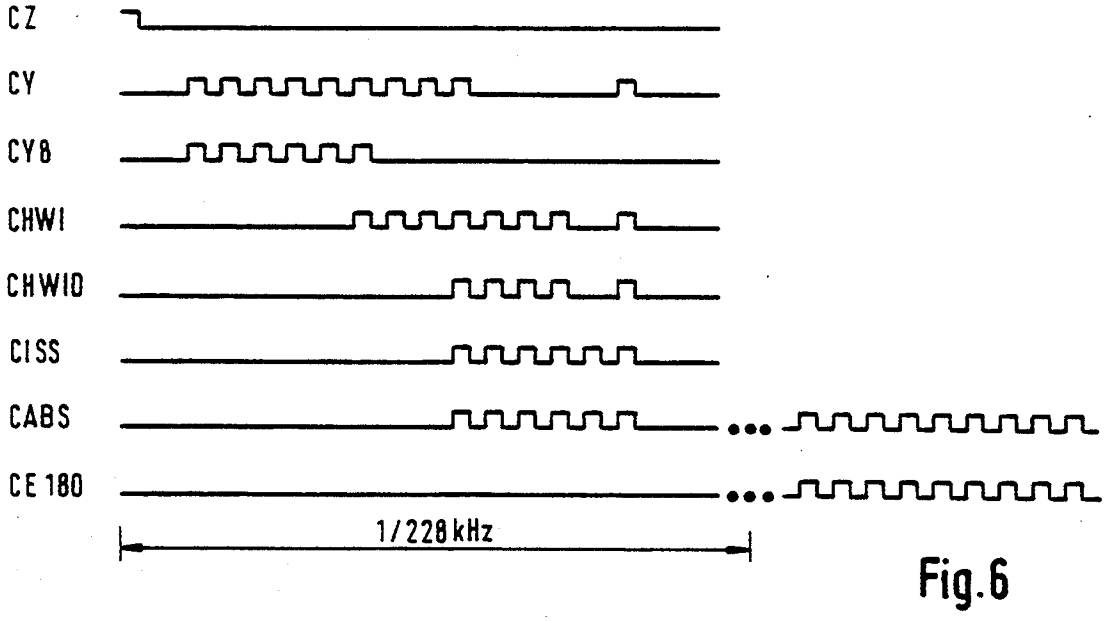
FIG. 6 is a set of signal diagrams, to a common time scale, of the clock signals necessary for the previously mentioned circuits.

FIG. 6 shows some selected clock signals as voltage-time-graphs, drawn to a common time scale. In a 228 kHz period, a maximum of 14 clock pulses are needed in addition to a clock 0-pulse (CZ). This enables generation of a clock frequency of 4.332 MHz. Clock signals CZ, CY, and CY8 are repeated at a frequency of 228 kHz, signal CHWI with a maximum frequency of 114 kHz, clock signals CHWID and CISS with 4.75 kHz, and clock signals CABS and CE180 with 2.375 kHz.

FIG. 7 is a block diagram of a clock signal generator 18. An oscillator 120 produces a frequency of 8.664 MHz from which a frequency of 228 kHz is produced using divider 121. Normally, the frequency divider 121 divides by 38, but with signals V57 and S57 at inputs 122 and 123, this can be varied by ±1.

The frequency of 228 kHz is divided by four in another frequency divider 124 producing the subcarrier frequency of 57 kHz. This is followed by a frequency divider 125, whose division ratio, when starting at a standard value of 12, can be increased or decreased by one, using signals V1 and S1 via input 126, 127.

Three additional frequency dividers 128 through 130 produce frequencies of 2.375 kHz, 1.1875 kHz and approx. 0.6 kHz from the initial frequency of 4.75 kHz of the frequency divider 125. Output signals of frequency dividers 121, 124, 125, and 128 are supplied to a logic circuit 131, with the individual clock signals being available at its outputs. In addition, the signals indicated by their frequencies in FIG. 7 likewise serve as clock signals.

Figure 8:
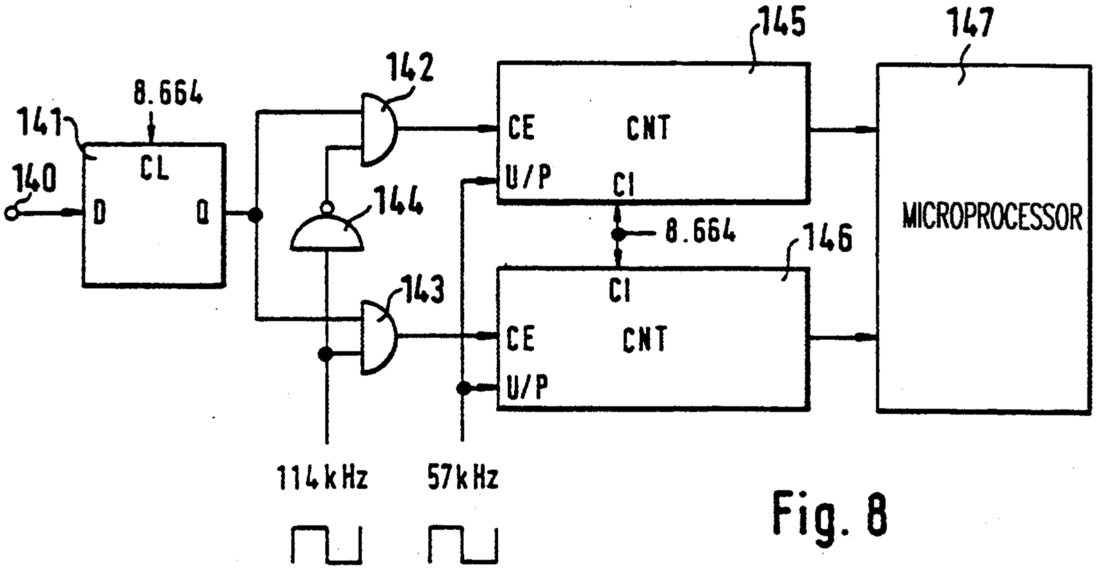
FIG. 8 is a block diagram of another embodiment of the demodulator according to the invention.

In the embodiment shown in FIG. 8, the radio data signal with amplitude limitation and with the frequency of the subcarrier, filtered out of the multiplex signal, is supplied to an input 140 and sampled at a clock rate of 8.664 MHz using a flip-flop 141. Two AND gates 142, 143 are controlled by a 114 kHz square-wave signal. The AND gate 142 is controlled opposite the AND gate 143 using an inverter 144.

The outputs of the AND gates 142, 143 are connected to count-enable inputs of two up/down counters 145, 146 causing them to alternately count the Ones (or the Zeros) of the input signal. The counters are supplied with a clock frequency of 8.664 MHz. In addition, the counters 145, 146 are controlled by a supplied 57 kHz square-wave signal. Outputs of the counters are connected to inputs of a microprocessor 147.

Counters 145, 146 each contain alternately 38 clock pulses of the 8.664 MHz clock signal synchronous to the 57 kHz matrix. During the inactive phases, while the respective other counter is counting, the counters are evaluated at a 57 kHz clock rate and reset.

Following is the complete time sequence, where n is an ordinal number for a 114 kHz clock period:

| | | |
|---|---|---|
| n-3: | counter 146 counts down, | counter 145 set to 0 |
| n-2: | counter 145 counts down | |
| n-1: | counter 146 counts up | |
| n: | counter 145 counts up, | secure counter 146 content<br>set counter 146 to 0 |
| n-3: | see above | data output (interrupt) |

In this manner, no adders are needed to generate a difference.

Figure 9:
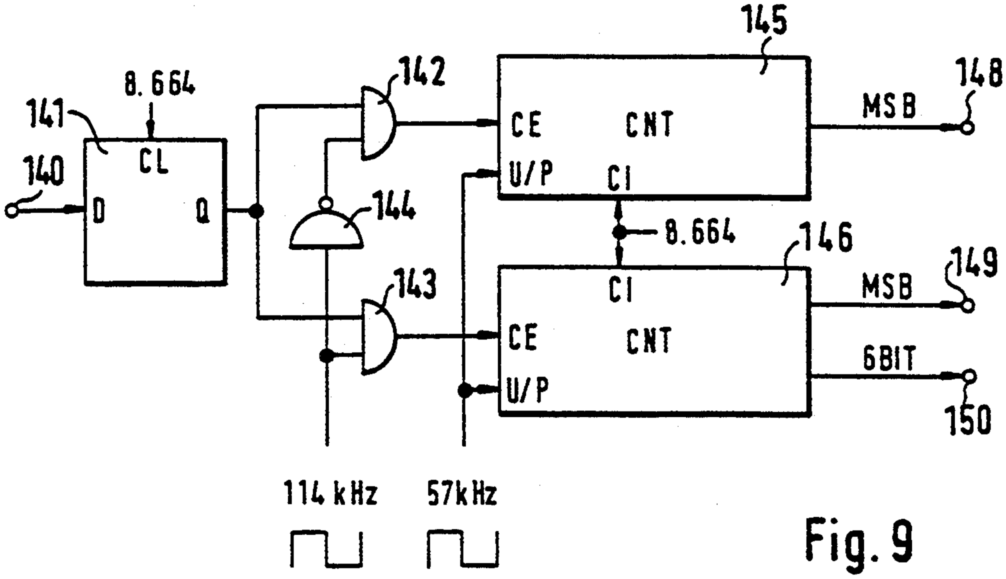
FIG. 9 is a block diagram of a circuit for integrating and dumping.

FIG. 9 shows a circuit similar to the circuit according to FIG. 8, where the components with the same symbols fulfill the same function. However, the circuit according to FIG. 9 is primarily not intended for use with a microprocessor, but (for instance) can be used instead of circuits 4 and 5 for a demodulator according to FIG. 1. Input 140 is then supplied with the output signal of limiter 3 (FIG. 1), while from outputs 148, 149 (FIG. 9) the respective most significant bit of the signals dumped from the counters 145, 146 is supplied to circuits 6 and 7 (FIG. 1). A value dumped from counter 146 with a width of 6 bits is supplied to circuit 8 (FIG. 1) from output 150.

In the circuit according to FIG. 9, the function of the digital band-pass filter 5 is incorporated by the counter 145, 146 being set to half of their content that has been dumped. This can simply be achieved through a shift function that is often provided for with counter components, but is not shown in FIG. 9. Anyway the shift function is needed for serial dumping, at least in the RDS channel.

Various changes and modifications are possible within the scope of the inventive concept. For example, features of one embodiment can be combined with features of another embodiment.

What is claimed is:

1. A demodulator for radio data signals, where transmission of these signals is carried out through phase shifting of suppressed subcarrier, where a multiplex signal, which contains a signal with the frequency of the subcarrier passes through a band-pass filter and an amplitude limiter, wherein the amplitude limited signal with the subcarrier frequency is sampled at a sampling frequency that is a multiple of the frequency of the subcarrier, and wherein the sampling values are summed over a preset portion of one period of the subcarrier, and wherein the summed sampling values are supplied to a digital signal processing circuit (5 through 13; 147).

2. A demodulator according to claim 1, wherein the digital signal processing circuit (5 through 13) is provided at its input with a digital band-pass filter (5) with a center frequency corresponding to the frequency of the subcarrier.

3. A demodulator according to claim 1, wherein the preset portion is one fourth.

4. A demodulator according to claim 2, wherein the digital signal processing circuit (5 through 13) also contains a circuit (8) for integrating the output signal of the digital band-pass filter over one half-wave each of the bit clock signal, circuits (9, 10) for calculating the differences of two successive integrals and the sum of the differences, and wherein the sum of the differences is used to generate the demodulated output signal and a switch phase correction signal.

5. A demodulator according to claim 4, wherein, in addition, a difference is generated from the differences of two successive integrals, and wherein a quality signal is generated from the difference of the differences.

6. A demodulator according to claim 4, wherein the digital band-pass filter (5) generates two orthogonal output signals, whose most significant bits are supplied to a traffic broadcast signal recognition circuit (6) and to a phase shift control circuit (7) for generating a regenerated subcarrier.

7. A demodulator according to claim 5, wherein the most significant bits of the sum of the differences and the difference of the differences are used to generate signals for controlling the phase of a regenerated radio data clock signal.

8. A demodulator according to claim 1, wherein two up/down counters (145, 146) clocked at a multiple of the subcarrier frequency are provided for summing the sampling values, and where these sampling values are alternately supplied to a control input (count enable) of one of the up/down counters (145, 146) for the duration of one fourth period of the subcarrier each, and wherein these up/down counters (145, 146) count up for one half period of the subcarrier and down for the other half period of the subcarrier, and wherein at each end of a period the counter reading of both counters is supplied to a circuit for signal processing.

9. A demodulator according to claim 8, wherein the signal processing circuit is a microprocessor (147) wherein a program for further evaluation of the supplied signals is executed.

10. A demodulator according to claim 8, wherein after counter reading transfer, the respective up/-downcounter (145, 146) is set to a predetermined fraction of the transferred counter reading.

11. A demodulator according to claim 9, wherein after counter reading transfer, the respective up/-downcounter (145, 146) is set to a predetermined fraction of the transferred counter reading.

* * * * *